United States Patent [19]

Mennesson

[11] 3,976,159
[45] Aug. 24, 1976

[54] AUTOMATIC SEQUENTIAL CONTROL DEVICE

[75] Inventor: Bernard René Mennesson, Paris, France

[73] Assignee: Societe a Responsabilite Limitee dite SERAM, Livry-Gargan, France

[22] Filed: May 29, 1974

[21] Appl. No.: 474,464

[30] Foreign Application Priority Data
May 29, 1973 France .............................. 73.19544

[52] U.S. Cl. .......................... 180/105 R; 74/336 R; 74/752 A; 74/752 B; 74/865; 251/25; 251/129
[51] Int. Cl.² ...................... F16H 5/24; F16H 5/60
[58] Field of Search ............ 180/105 R, 105 E, 108, 180/103; 74/752 A, 752 C, 752 D, 865, 866, 868, 869, 336, 336.5; 251/129, 25

[56] References Cited
UNITED STATES PATENTS

| | | | |
|---|---|---|---|
| 3,460,406 | 8/1969 | Strohm...................... | 180/105 R X |
| 3,621,735 | 11/1971 | Lemieux..................... | 74/869 X |
| 3,727,487 | 4/1973 | Forster....................... | 251/129 X |
| 3,768,338 | 10/1973 | Bahorich..................... | 74/869 X |
| 3,797,330 | 3/1974 | Ushisima..................... | 74/752 A |
| 3,823,621 | 7/1974 | Kubo......................... | 74/752 A |

*Primary Examiner*—M. H. Wood, Jr.
*Assistant Examiner*—John P. Silverstrim
*Attorney, Agent, or Firm*—Sughrue, Rothwell, Mion, Zinn & Macpeak

[57] ABSTRACT

The present invention relates to a device for automatically activating a machine as a function of a base signal without using electrical contacts.

The device according to the invention consists principally of means supplying a variable electric current as a function of the rate to be imparted to the machine, of a servolimiter converting into a variable hydraulic control pressure said electric current duly processed and amplified, of at least one hydraulic distributor associated with at least one control jack, the slide valves of the distributor being subject to the action of said variable hydraulic control pressure and at least to the action of counteracting elastic means having predetermined calibration values and the associated jacks being activated by a general service pressure transmitted by the distributors and acting on the elements of the machine to be controlled automatically.

5 Claims, 11 Drawing Figures

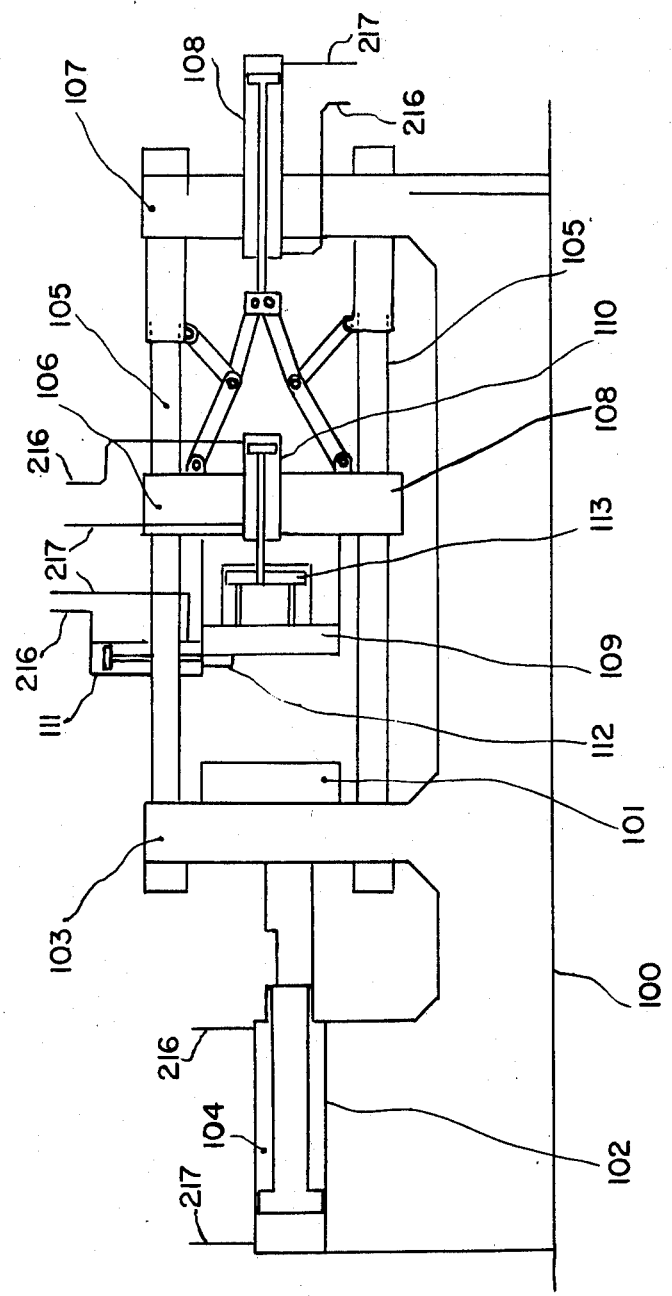

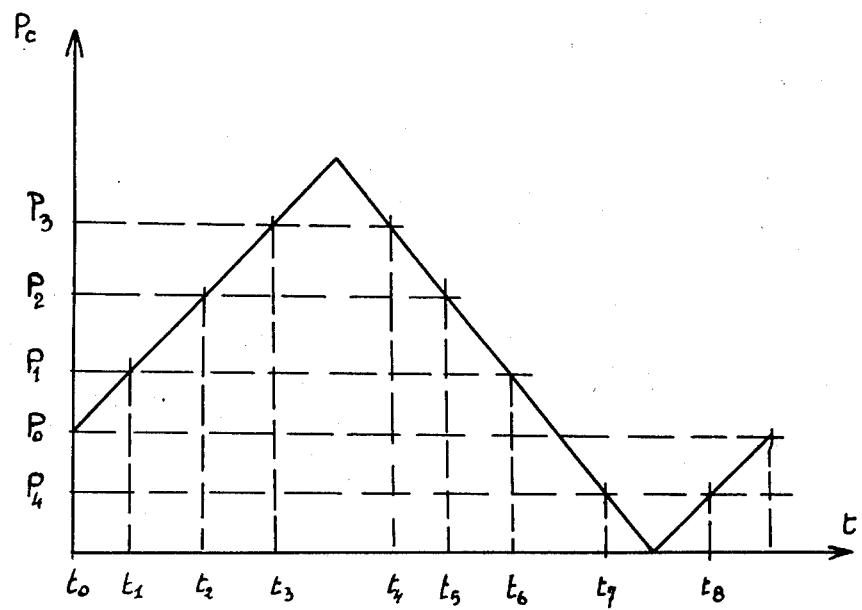
FIG. II

AUTOMATIC SEQUENTIAL CONTROL DEVICE

The present invention may be used in particular to control machines having an automatic cycle such as, for example, an injection press.

BACKGROUND OF THE INVENTION

1. Field of the Invention

The present invention relates to a sequential hydraulic control device of a machine, that is, a device in which there is a hydraulic control pressure which is a direct function of the results it is wished to obtain from the machine.

2. Description of the Prior Art

Machine tools, presses, automobiles and numerous other types of machines can be actuated automatically by hydraulic control means consisting in the main of a hydraulic pressure generator and distributors directing the pressure delivered by the generator into jacks or motors. The distributors are generally controlled by electromagnets which consume a fairly high electric power of the order of several tens of watts and with a high inductance. These electromagnets are themselves controlled automatically by electric circuits comprising essentially contactors consisting in principal of a distributor contactor, contactors which open or close as a function of a parameter such as the time, the speed of the vehicle, etc. In devices of this type, the electric circuit is very expensive. It may represent more than a third of the price of the entire device, mainly due to the fact that contactors are needed with have a high cut-off capacity. Furthermore, control units of this type function either completely or not at all.

SUMMARY OF THE INVENTION

The present invention relates to a device which enables the size and cost of the electric circuit to be reduced considerably with respect to those of the hydraulic elements and furthermore to regulate in a much simpler manner the triggering of the different distributors and the reaction speed, that is, to actuate in a much more flexible manner the operating elements of the machine.

According to a main feature of the invention, the sequential hydraulic control device actuating a machine consists mainly of means supplying a variable current as a function of the rate to be imparted to the machine, this current constituting the base signal for automatic operation. It further comprises means for processing and amplifying said electric signal, a servolimiter converting into a variable hydraulic control pressure the signal which has been suitably processed and amplified and at least one hydraulic distributor associated with at least one control jack. The distributor supplies a fluid at a general constant pressure to the associated control jack from a general pressure source provided on the machine to be actuated automatically, the control jack automatically actuating the working element of the machine to which it is allocated in one direction or the other depending on the position of the slide valve of the distributor. The slide valve is itself subject both to the action of the variable control pressure supplied by the servolimiter as a function of the base signal and by an opposing force. This opposing force is exerted by at least one elastic means having a predetermined calibration value such that the hydraulic jack associated with the distributor automatically activates the working element of the machine to which it is allocated in one direction or the other depending on whether the variable control pressure increases and exerts on the slide valve a force which becomes substantially greater than the predetermined counteracting force or whether the variable control pressure decreases and exerts on the slide valve a force which becomes substantially lower than the value of said predetermined counteracting force.

According to another feature of the invention, the counteracting means comprise means for regulating the stress they exert on the slide valves of the distributor with which they are associated such that by means of these regulating elements it is possible to vary at will the instant at which the distributor comes into operation as a function of the base signal.

According to another feature of the invention, the counteracting forces which act on the slide valves in opposition to the variable control pressure are exerted by elastic means which do not have the same law of displacement in one direction as in the other, thereby enabling the elements of the machine to be activated in one direction by a predetermined value of the base signal and in the other direction by a different predetermined value.

According to another feature of the invention, the automatic hydraulic sequential control device comprises means for varying the calibration of the elastic means as a function of a parameter other than the base signal such that the elements of the machine may be automatically activated at times as a function of two different parameters.

According to another feature of the invention, the servolimiter comprises either electrical or mechanical means or electrical and mechanical means for varying its calibration as a function of at least one additional parameter apart from the base signal such that the control pressure supplied by the servolimiter varies at least from the single to the double quantity for the same value of the base signal depending on the values of the additional parameters.

To illustrate the advantages of the present invention, its application for the automatic sequential control of the gearbox of an automatically controlled vehicle will be compared to the controlling of the same gearbox by means of a conventional electrical circuit.

It is to be assumed that the vehicle in question has a four-ratio gearbox, omitting reversing and clutch engagement to simplify the description and that the four gear ratios which correspond to the four forward speeds are obtained by means of two double couplings each controlled by two jacks guided by a distributor. When the gearbox is an automatic gearbox controlled by a conventional electrical circuit, each distributor is controlled by two electromagnets. To operate a gearbox of this type, it is necessary to simultaneously connect or disconnect a plurality of electrical contacts so as to supply or not supply the windings of the electromagnets corresponding to the jacks to be simultaneously put under pressure or in pressure relief. The electric circuit of a device of this nature is thus necessarily costly and complicated because the intensities to be cut-off or established are fairly high, for example, of the order of 1 ampere under 24 volts and great precision is required in regulating the opening or closing of the contacts to obtain strict simultaneity of operations which is indispensible. In addition, owing to the high inductance of the windings of the electromagnets, there is a high risk of the contacts being put out of order and of deteriorating.

As will be made apparent from the following description, it is possible with the device according to the invention to obtain the same result by far simpler means by substituting for the control by electric contacts hydraulic sequential control even though the orders to be given are not themselves sequential, and by using a single electric winding having a low inductance and by excluding all electrical contacts. Consequently, the device according to the invention is both less costly and much more reliable than the devices having electrical contacts such as those described above.

Other objects, features and advantages of the present invention will be made apparent from the following detailed description of various embodiments thereof provided by way of non-limitative examples only with reference to the accompanying drawings.

BRIEF DESCRIPTION OF THE DRAWINGS

FIG. 9 is a diagrammatic view of an injection press controlled automatically by the device according to the invention.

FIG. 11 shows the operating diagram of the machine according to FIG. 9 as a function of time.

DESCRIPTION OF THE PREFERRED EMBODIMENTS

Figure 1:
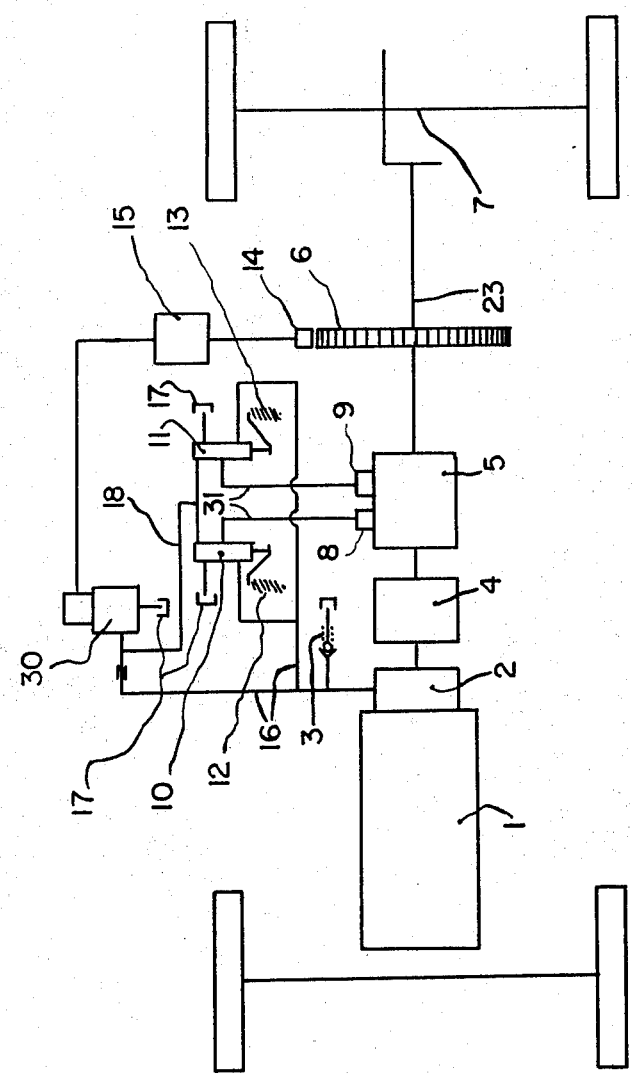
FIG. 1 is a diagrammatic view of an automobile having a three-ratio gearbox automatically controlled by a device according to the invention.
Figure 2:
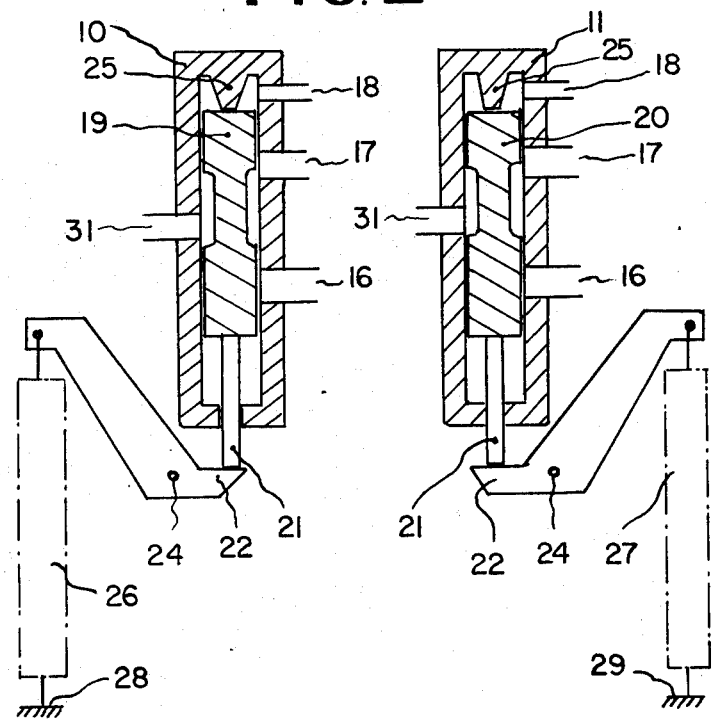
FIG. 2 is a diagrammatic view of the slide valves of the distributor of the device according to the invention and of the elastic means associated therewith.
Figure 3:
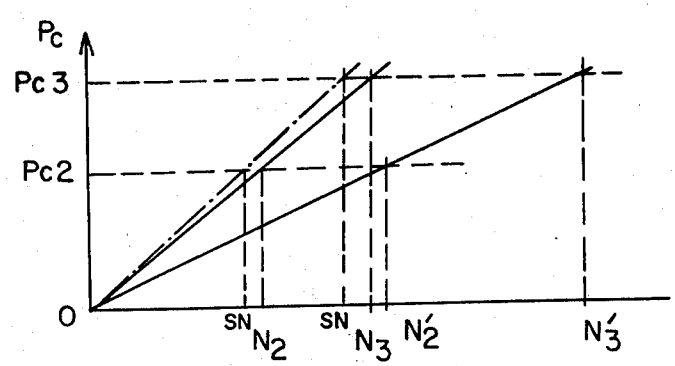
FIG. 3 shows the correspondence curve between the speed of the vehicle and the control pressure of the distribution slide valves depending on whether the speed of the vehicle is increasing or decreasing.
Figure 8:
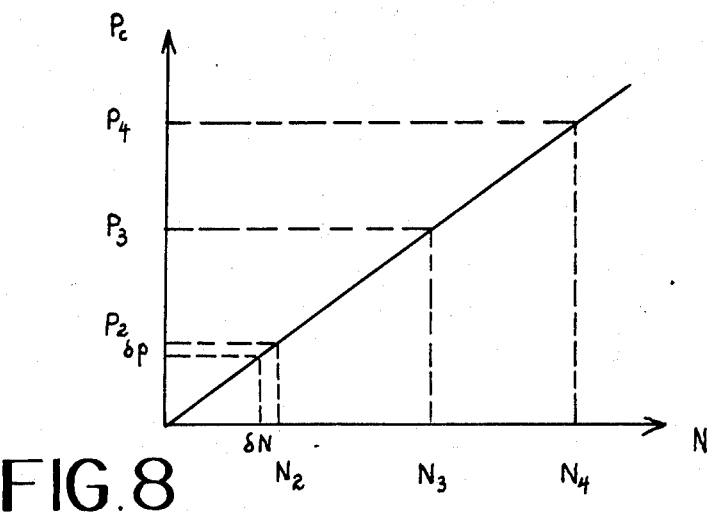
FIG. 8 shows the correspondence curve between the speed of the vehicle according to FIG. 6 and the control pressure of the device according to the invention.

In the embodiment represented in FIGS. 1, 2 and 3 there is provided (in FIG. 1) a diagrammatic drawing of a vehicle comprising an engine 1 which drives in the first instance a hydraulic pump 2 supplying fluid at a general constant pressure P obtained by means of a pressure limiter 3 into a circuit 16. The engine shaft further drives a variable coupling coupler 4 and thereafter a gearbox 5 having three ratios. A phonic wheel 6 is wedged on the transmission shaft 23. The rear wheels of the vehicles are driven through the intermediary of a rear bridge 7. The gearbox which is of particular interest is of the type having a series of epicycloidal pinions with which it suffices to block one series of pinions and then another to obtain the different ratios. It will be assumed that without any external action, the gearbox is in the lowest gear. The box is caused to move into the intermediate gear by placing the oil in a jack 8 under pressure. By putting under pressure the jack 9 while leaving the jack 8 under pressure, results in the highest gear being engaged. By removing the oil pressure in the jack 9, an internal spring returns the jack and the box returns to the intermediate ratio. Likewise, by eliminating the pressure in the jack 8, the jack returns under the influence of an internal spring and the box passes to the lowest ratio.

The jacks are controlled respectively by distribution slide valves 10 and 11. These slide valves are displaced under the effect of springs 12 and 13 and a control pressure Pc produced in the supply channel 18 of the distribution slide valves from the general pressure P through the intermediary of a servolimiter 30 (as described in French Pat. No. 1 525 934) which itself is controlled by an intensity I such that I equals KN, N being the rotational speed of the transmission shaft which is obtained through the intermediary of a sensor 14 and which is transformed into intensity in an electrical box 15 connected to the pressure limiter 30.

FIG. 2 is a more detailed view of a possible embodiment of the distributors 10 and 11. Pistons 19 and 20 may be displaced within the cylinder formed by the elements 10 and 11. The pistons 19 and 20 are brought into mechanical abutment against the lugs 25 by the elastic means formed by the levers 22 acting on the projecting rods 21 of the pistons and pivoting about the axis 24. These levers are returned by the springs 26 and 27 which are attached by their other end to the fixed points 28 and 29. Therefore, inherently during rotation of the levers 22 about their pivot axes 24, the distance between the pivot axis 24 in each case and the contact point of the piston shaft with said levers shifts such that the control pressure necessary to move said slide valve from said first position and overcome said biasing means towards said second position is different from that control pressure acting on the slide valve when said biasing means overcomes said control pressure to shift said slide valve from said second position to said first position.

The role of the pistons is to place the jacks 8 and 9 of the box 5 either in communication with the general pressure P supplied by the channel 16 or with the sump 17 via the line 31.

In addition, the elastic means for returning the pistons are arranged in such a way that the force which they exert on the pistons is practically independent of their position in the cylinder.

FIG. 3 represents the correspondence established by the sensor 14 and the electrical box 15 between a number of rotations N of the transmission 23 and the intensity I supplied to the servolimiter to which the control pressure Pc is proportional.

The device operates as follows: The control pressure Pc supplied in the channel 18 by way of the servolimiter 30 is proportional to N which is the rotational speed of the transmission shaft, through the intermediary of the phonic wheel 6 of the sensor 14, of the electrical box 15 and of the servolimiter 30 ($Pc = KN$).

This pressure Pc acts on the pistons 19 and 20 in the cavities of the distribution slide valves 10 and 11 provided about the end lugs 25. If S represents the section of the pistons, the value of the force exerted by the pressure Pc is Pc × S. This force acts against the elastic means 12 and 13 consisting of the elements 22, 24, 26 and 27, 28 and 29. In view of the fact that the gear changing ratios of the box 5 must change for the values $N_2$ and $N_3$ of the speed N of the transmission shaft 23, the values $Pc_2$ and $Pc_3$ of the control pressure Pc will be obtained as is represented in FIG. 3. The value of the forces exerted on the pistons 19 and 20 by the lugs 25 is then $Pc_2 \times S$ and $Pc_3 \times S$. If the elastic means are calibrated so as to exert forces equal to $Pc_2 \times S$ and $Pc_3 \times S$ on the shafts 21, the pistons will change their position for the values $Pc_2$ and $Pc_3$.

When the force exerted by the elastic means is greater than that exerted by Pc, the jacks 8 and 9 of the box 5 are in pressure relief or retracted and if the contrary is true, these jacks are under pressure and extended.

When the vehicle starts under the influence of the clutch, N will increase. When N reaches the value $N_2$, the piston 19 will rapidly change its position and the vehicle which was in the lowest gear ratio will pass to the intermediate ratio.

If N continues to increase, its value will reach $N_3$ and at this point the piston 20 will rapidly change its position and the gear will move to the highest ratio.

Conversely, if the speed of the vehicle decreases and N becomes lower than $N_3$, the piston 20 will move into abutment against the lug 25 and the gear will pass to the intermediate ratio. Likewise, when N becomes higher than $N_2$, the gear will pass to the lowest ratio.

It is noteworthy that at the time of changing to a higher gear ratio, the speed N is not varied instantly. If the power of the vehicle is sufficient for N to continue increasing, the change in the ratio is stable but if the power of the vehicle is insufficient N will tend to decrease and consequently cause a return to the preceding gear ratio. It is possible to use two means either separately or simultaneously to avoid this pumping or hunting phenomenon.

As a result of mechanical friction, the servolimiter has a certain "hysteresis" which is represented in FIG. 3 by the perforated curve, that is, the curve of Pc increasing as a function of N differs from that of Pc decreasing as a function of N. This being the case, it will be noted from the curve that the ratio for N decreasing will only change for a value N-dN. This suffices to provide a certain amount of stability.

It is also possible to mount the elastic means 12 and 13 in such a way that the biases which they exert on the shafts 21 decrease as the pistons move away from their lugs 25. This also brings $N_2$ and $N_3$ to the values $N2-dN_2$ and $N3-dN_3$ when the transmission speed is decreasing.

Furthermore, it is virtually essential for the values of $N_2$ and $N_3$ with which there is a ratio change in the box 5, to depend on the position of the accelerator: These values varying quite easily from a single value to a double value depending on whether the accelerator is slightly depressed or completely depressed. A description will be provided hereafter in connection with a four-ratio gearbox of a device constituting one of the objects of the present invention which enables the values $N_2$ and $N_3$ to be varied as a function of the extent to which the acceleration pedal of the vehicle is depressed. This device could also be associated with the embodiment which has been described.

Figure 6:
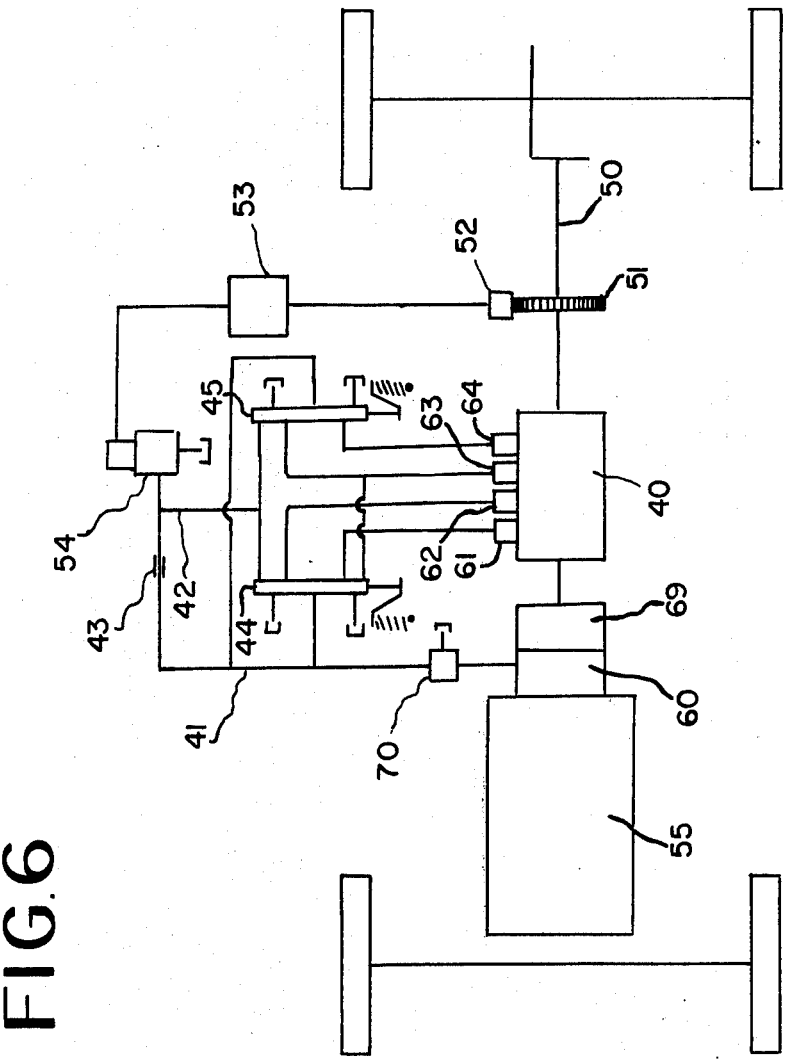
FIG. 6 is a diagrammatic view of an automobile having a four-ratio gearbox controlled by a device according to the invention.

In the embodiment represented diagrammatically in FIG. 6, 50 designates an appropriate transmission element of the vehicle of which the gearbox 40 is to be actuated by means of the device according to the invention. The transmission element 50 and phonic wheel 51 wedged or fixed thereupon are driven in rotation in proportion to the speed of the vehicle. 52 designates a sensor changing the rotational speed N into an electric voltage V proportional to said speed. For example, 52 is an impulse sensor enabling the number of teeth passing per second to be counted and enabling a voltage proportional to this number to be supplied in an electric box 53. After suitable amplification, the voltage V is then converted into a current intensity I and the latter is applied to a pressure limiter 54 controlled by the solenoid of the type described in French Pat. No. 1 524 934. The limiter in question is supplied via a channel 41 with a fluid provided on the vehicle under the pressure P by means of a pressure regulator 70. This limiter supplies a limiter variable control pressure Pc proportional to the intensity I applied to the terminals of its solenoid, that is, a pressure Pc proportional to the speed of the vehicle in the channel 42,43 describing a diaphragm. The limiter pressure Pc is then simultaneously applied to two distributors 44 and 45 and acts on the slide valves of these distributors against the counteracting forces exerted by the elastic means on the opposite ends of the slide valves.

Depending on the position of its slide valve, the distributor 44 acts alternately on the jacks 61 or 62. Depending on the position of its slide valve, the distributor 45 acts alternately on the jacks 63 or 64.

Depending on whether they are activated or not, the jacks 61, 62, 63, 64 act or do not act on the couplings and engage the pinions associated with these couplings of the gearbox 40 of the vehicle. 55 designates the engine of the vehicle, 60 a hydraulic pump activated by said engine and supplying the general pressure P and 69 designates the couplings.

Figure 7:
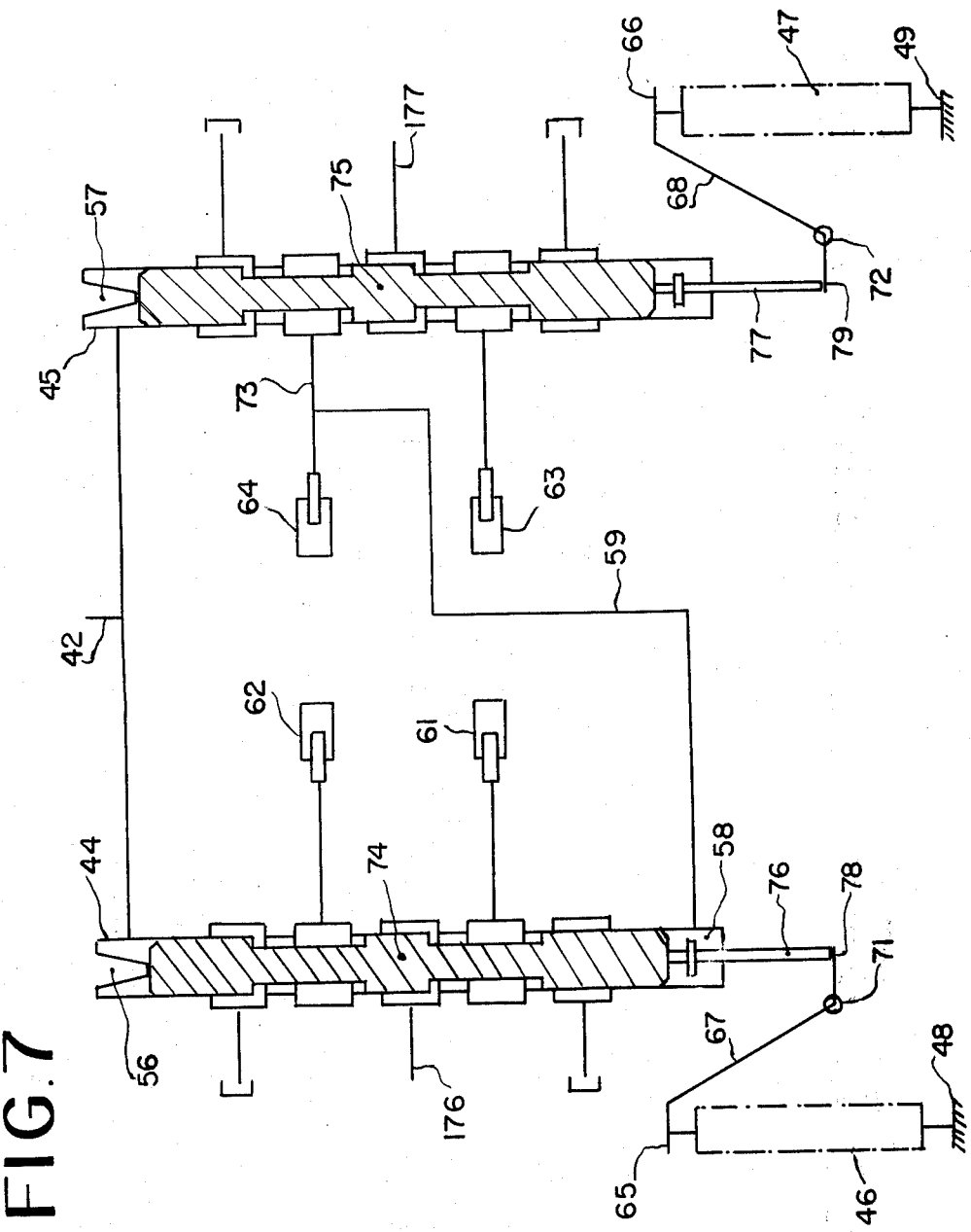
FIG. 7 is a diagrammatic view of the distribution slide valves of the device according to FIG. 6 and of the elastic means associated therewith.

FIG. 7 provides a more detailed view of the subassembly constituted by the distributors 44 and 45, their associated elastic means and the jacks 61, 62, 63 and 64 which are associated therewith.

The limited pressure Pc proportional to the speed of the vehicle acts on each of the distributors 44 and 45 and actuates the slide valve 74 of the distributor 44 and the slide valve 75 of the distributor 45, respectively.

The same elastic means which exert variable forces on the ends of the slide valves 74, 75 of the distributors 44, 45 act on the opposite ends of each slide valve.

These elastic means may be constituted, for example, by springs 46, 47, one end of which is secured to the fixed points 48, 49 and the other end to the ends 65, 66 of the levers pivoting about their stationary axes 71, 72. The other ends 78, 79 of the levers 67, 68 act on the shafts 76, 77 integral with the slide valves 74, 75 of the corresponding distributors. The unequal arms of the levers 67, 68 are calculated and the fixed attachments points 48, 49 of the springs 46, 47 are positioned with respect to the ends 65, 66 of the levers and their axes 71, 72 in such a way that the force applied by the assembly on the shafts 76, 77 decreases as the pulling stress on the springs themselves 46, 47 increases.

The distributors 44, 45 also comprise abutments 56, 57, (FIG. 7) at their ends at which the limited pressure Pc arrives in a channel 42, and the distributor 44 comprises at the opposite end of its slide valve to that receiving the limiter pressure Pc, a chamber 58 which communicates by way of a channel 59 with the feed circuit 73 of the jack 64 associated with the distributor 45.

The gearbox 40 of a vehicle provided with the hydraulic sequential control device according to the invention which has been described functions in the following manner:

It will be assumed that the gearbox in question has four-gear ratios (I, II, III, IV) provided by two double couplings each controlled by two of the four jacks (61, 62, 63, 64) and that the sequence of the increasing ratios is obtained in the following manner:

|  | Under Pressure | Under Pressure Relief |
|---|---|---|
| Ratio No. I | Jacks 61 and 63 | 62 and 64 |
| Ratio No. II | Jacks 62 and 63 | 61 and 64 |
| Ratio No. III | Jacks 61 and 64 | 62 and 63 |
| Ratio No. IV | Jacks 62 and 64 | 61 and 63 |

When the vehicle is stationary, the transmission element is immobile. The intensity applied to the pressure limiter is 0, its valve is open and the pressure Pc is 0. Under these conditions, only the forces $F_{44}$ and $F_{45}$ act on the slide valves of the distributors 44 and 45, these forces being produced by their elastic means. These forces bring the slide valves into mechanical abutment against the abutments 56 and 57. The slide valves are mounted in such a way that the jacks 62 and 64 are in pressure relief and the jacks 61 and 63 under pressure. The gearbox is thus in ratio I.

When the vehicle is going to start and then accelerate, the transmission element will turn and the pressure Pc will increase from 0. As long as (Pc × S) is lower than $F_{44}$ or $F_{45}$, the gearbox will remain engaged in the ratio I, S being the surface of the ends of the slide valves 74, 75 to which is applied the control pressure Pc. Pc × S represents the force exerted by the jacks 44, 45 against the opposing forces $F_{44}$ and $F_{45}$. As long as the forces exerted by the pressure Pc on the end of the slide valves 74, 75 remain lower than those exerted by the counteracting elastic means, the slide valves of the distributors are not displaced.

When the speed of the transmission element continues to increase, the pressure Pc supplied by the limiter and proportional to the rotational speed reaches a value $P_2$, such that $P_2 \times S = F_{44}$. At this instant, the slide valve of the distributor 44 is rapidly displaced and comes into mechanical abutment in the direction of the elastic means, owing to the arrangement of the same which is described above and to the resulting law of variation of the force $F_{44}$. As a result of this arrangement and this law, the speed $N_2$ to which this pressure $P_2$ corresponds may decrease slightly and fall to ($N_2 - dN$) without the slide valve 74 changing its position again. For its part, the slide valve 75 remains in the position which it occupied previously allowing for the fact that the calibration of its elastic means is higher than that of the elastic means of the distributor 44. Consequently, when Pc reaches the value $P_2$, that is, when the number of rotations of the transmission element reaches the value $N_2$ at which the gear ratio II is to be engaged in the gearbox, the jacks 61, 64, are in pressure relief and the jacks 62 and 63 under pressure which corresponds to the passage to ratio II according to the above table. The gearbox remains in this ratio as long as Pc oscillates between the pressure $P_2 - dP$ and a pressure $P_3$ such that $S \times P_3 = F_{45}$. When the number of rotations of the transmission element reaches the value $N_3$ at which the gearbox is intended to pass to the gear ratio III, the slide valve of the distributor 45 rapidly changes its position allowing for the fact that the force $F_{45}$ has been selected such that $S \times P_3 = F_{45}$ and that the elastic means of the distributor 45 are also arranged in such a way as to cause a rapid displacement of the slide valve for this value of the pressure Pc introduced into the distributor 45 without being subject to displacement in the opposite direction when the number of rotations decreases slightly to the value $N_3-dN$. When the slide valve of the distributor 45 has been displaced and has been brought into mechanical abutment on the side of its elastic means, the jack 64 is put under pressure and the jack 63 is put in pressure relief. The general feed pressure P of the distributors 44, 45 which is applied to the same by way of the channels 176, 177 is thus transmitted to the jack 64 and is also communicated through the intermediary of the supply circuit 73 of the jack 64 and of the channel 59 to the chamber 58 of the distributor 44. This pressure P is thus applied to the surface s of the corresponding end of the slide valve of the distributor 44 which will be acted on by the force $P_3 \times S$ and in the opposite direction by the joined forces sP mentioned above and $F_{44}$ of the elastic means.

The shaft 76 is provided with a section which is such that the impact surface s of the end of the slide valve is equal to $$\frac{SP_4 - F_{44}}{P},$$

in which $P_4$ is the value of the pressure provided by the limiter at which the gearbox is designed to pass to the fourth gear ratio and in which $F_{44} = SP_2$, $P_2$ being the value of the pressure provided by the limiter at which the gearbox passed to ratio II. At this point, $$s = \frac{S(P_4 - P_2)}{P}$$

and the slide valve 74 of the distributor 44 which was in mechanical abutment on the side of its elastic means is then subjected on the one hand to the force $SP_3$ which tends to keep it in this position and to the force $sP + F_{44}$ or $S(P_4 - P_2) + SP_2$ or to the force $SP_4$ which is greater than $SP_3$. As a result, the slide valve of the distributor 44 will come into mechanical abutment against the abutment 56.

Under these conditions, the control jacks 61 and 62 of the gearbox 40 will be put under pressure and in pressure relief, respectively. As far as the jacks 61, 62, 63 and 64 are concerned, the necessary conditions for changing the gears to gear ratio III have been fulfilled.

When the speed of the transmission element finally reaches the number of rotations $N_4$ and the pressure supplied by the limiter reaches the corresponding pressure $P_4$, nothing passes into the distributor 45 since its slide valve is subject to a pressure $SP_4$ which is greater than the preceding pressure $SP_3$ which had already placed it in mechanical abutment on the side of its elastic means. In contrast, in the distributor 44, the slide valve again changes its position. It was formerly in mechanical abutment against its abutment 56 and it will come back into mechanical abutment on the side of its elastic means, since as was indicated above, the section s has been designed such that $$s = \frac{S(P_4 - P_2)}{P}$$

It will thus be acted on by a force $S(P_4 + dP_4)$ which will tend to bring its slide valve into mechanical abutment on the side of its elastic means, this force being greater than the counteracting force $sP + F_{44}$ $$sP + F_{44} = S(P_4 - P_2) + SP_2 = SP_4$$

as soon as N rises above $N_4$.

Under these conditions, the following occurs to the control jacks of the gearbox 40: 62 and 64 are put under pressure; 61 and 63 are put in pressure relief — which corresponds to the conditions under which the gearbox moves into the gear ratio IV. The successive passages of the gearbox 40 to the ratios I, II, III, IV for the number of rotations of the transmission element $N_1$, $N_2$, $N_3$, $N_4$ has thus been achieved. The ratios are changed down by the reverse process, not for the values $N_4$, $N_3$, $N_2$ and $N_1$ but $(N_4 - dN)$, $(N_3 - dN)$, $(N_2 - dN)$, $(N_1 - dN)$, which are those to which the elastic means respond.

Thus a sequential hydraulic control method has been obtained from orders which are not themselves sequential by using a single electrical winding which is that of the sole pressure limiter controlled by the solenoid supplying the limiter pressure Pc to the two control distributors and without using any electrical contact.

When it is a question of hydraulically controlling the gearbox 40 of a vehicle, it is not sufficient to cause the gear ratio to change for the predetermined values $N_1$, $N_2$, $N_3$, $N_4$ of the speed of the vehicle and to prevent movement to a lower gear ratio when each of these numbers of rotations undergoes a slight decrease $(N_1 - dN)$, $(N_2 - dN)$, $(N_3 - dN)$, $(N_4 - dN)$. It is generally desirable to be able to vary within certain limits the values $N_1$, $N_2$, $N_3$, $N_4$ at which a gear change is produced as a function of the vehicle acceleration. In principal, the values of $N_1$, $N_2$, $N_3$, $N_4$ should be correspondingly greater, that is, the gearbox should remain in the lower gear ratio while greater acceleration of the vehicle is sought, that is, with the accelerator pedal depressed further.

Figure 4:
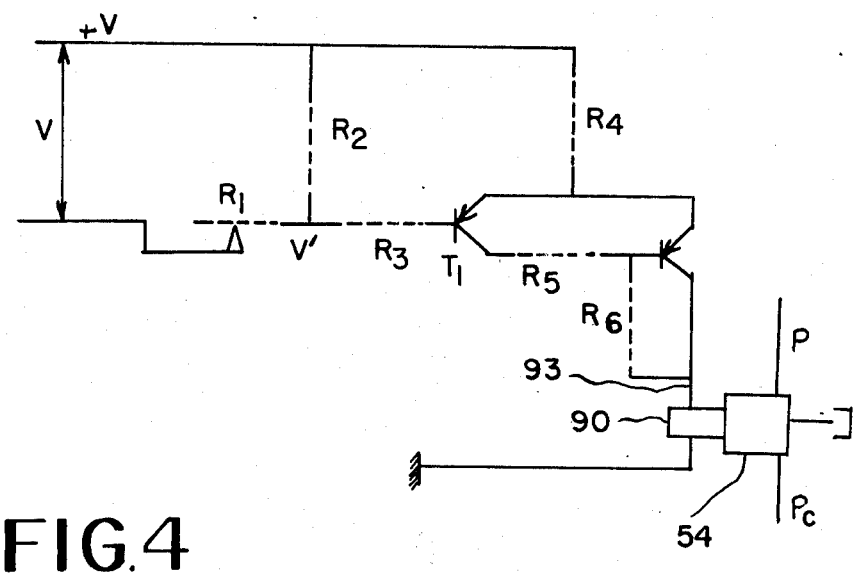
FIG. 4 shows an electronic control circuit of the device according to the invention supplying an intensity which is both a function of the speed of the vehicle and of the position of the accelerator.

To obtain this result, instead of directly converting the speed of rotation of a suitable transmission element of the vehicle into an electrical control intensity of the servolimiter, an electrical circuit of the type described in FIG. 4 can advantageously be used. In this circuit, 54 designates a servolimiter of the type described in French Pat. No. 1 525 934, which supplies from a general feed pressure P a control pressure Pc which is proportional to the intensity applied to its solenoid 90. This intensity is supplied to the same by the circuit shown in FIG. 4 in which V is the voltage applied to the terminals of the circuit and which is proportional to the speed of rotation of the vehicle. $R_1$ is a variable resistance proportional to the depression of the accelerator pedal of the vehicle, the latter being connected, for example, to a rheostat. $R_2$, $R_3$, $R_4$, $R_5$, $R_6$ are constant resistances and $T_1$, $T_2$ are transistors, the consumption of the driver transistor $T_1$ being practically 0. This being the case, it is possible to write:

$$V'/R_2 = V/(R_1 + R_2)$$

By virtue of the amplification system constituted by the part of the circuit comprising the transistors $T_1$, $T_2$ and the resistances $R_5$, $R_6$, $V' = k'Pc$, the control pressure supplied by the limiter 54 is proportional to the voltage $V'$, and $V = kN$ as indicated above.

This being the case, $$kN = k'Pc \, \frac{R_1 + R_2}{R_2}$$

or $N = KPc(R_1 + R_2)$ and hence $$K = \frac{k'}{kR_2}.$$

Thus by varying $R_1$ between 0 and $R_2$, for example, N will vary in a ratio of 1:2 for the same value of Pc. Therefore, if $R_1$ is a variable resistance supplied by a rheostat, the slider of which is associated with the position of the accelerator pedal, the values of $N_1$, $N_2$, $N_3$, $N_4$, at which the gearbox is to change its gear ratio, may vary from a single quantity to a double quantity depending on the value of $R_1$, that is, the degree of depression of the accelerator pedal. The same result may be obtained mechanically (see FIG. 5). In a servolimiter 54 such as the one described in French Pat. No. 1 525 934, a shaft 81 which presses against a spring 82 is caused to act on the valve 80. The other end of this spring is pressed against a shaft 83, the position of which is determined by a cam 84 mounted for rotation about an axis 85 and directly associated by way of a pushrod 86 with the accelerator pedal 87 of the vehicle. The pedal itself oscillates about a stationary axis 88.

The intensity $I = KN$, applied in the winding 90 of the limiter 54 through the intermediary of the conductors 93 produces in the core 91 a force which is exerted on the valve 80 through the intermediary of a shaft 92. The force acting on the valve will ultimately be the result of two opposing forces, one resulting from the intensity I, the other from the position of the cam 84, that is, the accelerator pedal 87. Now the control pressure Pc supplied by the limiter by way of the opening 94 from the general pressure P introduced by way of the feed opening 95, 96 designating the sump, is proportional to the force acting on the valve. Consequently, the pressure Pc will depend both on the number of rotations N or on the speed of the vehicle and on the position of the accelerator.

Figure 5:
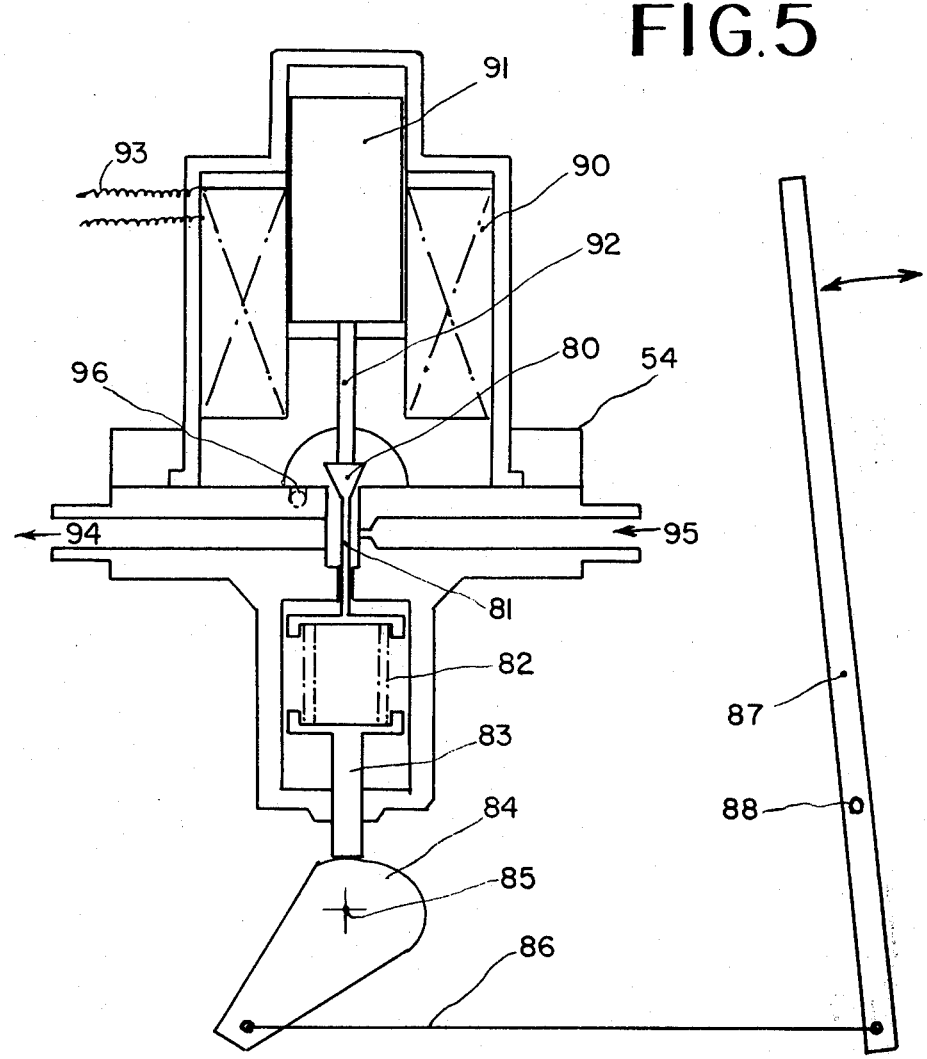
FIG. 5 shows a mechanical device for varying the control pressure as a function of the position of the accelerator.

It will be noted that with the mechanical device represented in FIG. 5, acting by way of the cam, it is possible to introduce a nonlinear correction by designing correctly the profile of the cam. This is also possible with an electrical system but it is much more complicated.

By means of the embodiment represented diagrammatically in FIG. 9, it is proposed to indicate how it is possible to use the sequential hydraulic control system according to the invention for the operation of a machine with an automatic cycle—in this case a press for injecting, for example, aluminum under pressure. In the case of the example selected, the machine is known as a cold chamber machine comprising essentially a frame 100 comprising a support 102 of the injection jack 104, a support 103 of the stationary part 101 of the mold, a rear part 107 supporting the closing jack 108. Between the supports 103 and 107 are placed the columns 105 on which slides a mobile platform 106 bearing a mobile part 109 of the mold and an jack 110 for ejecting the molded parts, this jack 110 activating the ejector support plate 113. The mobile part of the mold frequently comprises — but not necessarily — one or more jacks 111 insuring the displacements of the cores 112 of the mold.

Figure 10:
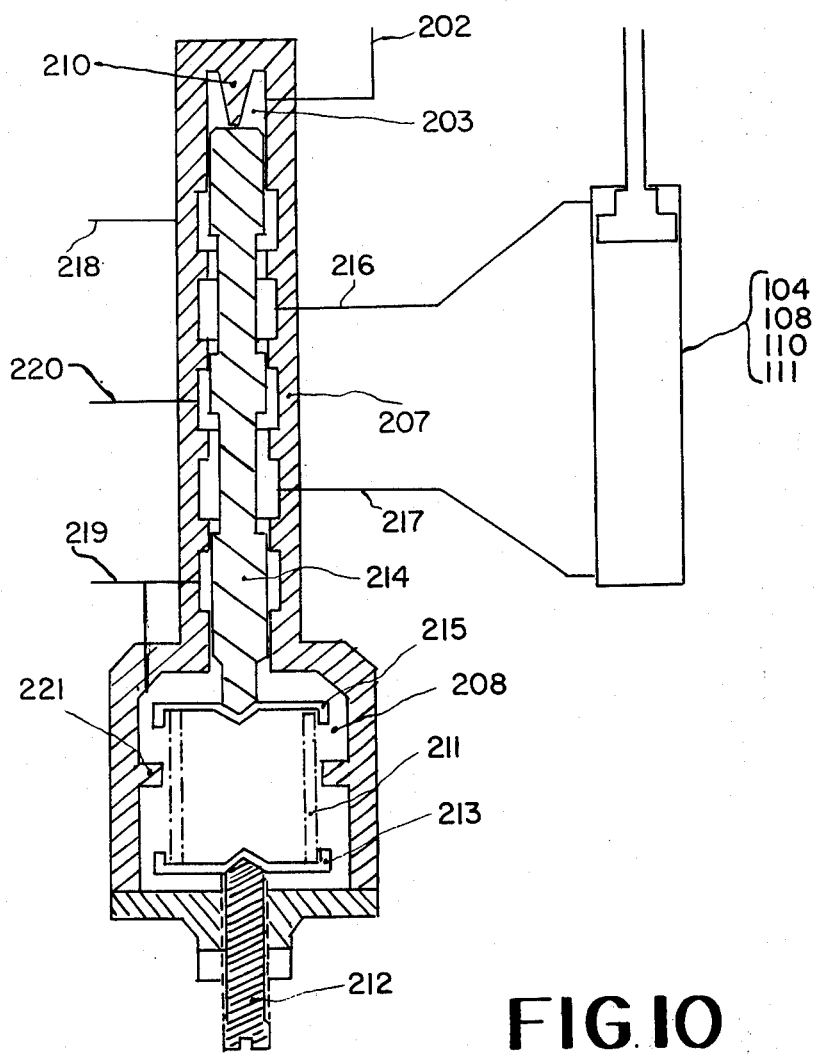
FIG. 10 is a diagrammatic view of a distributor associated with one of the control jacks of the machine according to FIG. 9 and of the elastic means associated with the distributor.

A distributor which is shown in FIG. 10 is connected to each of the jacks 104, 108, 110, 111. This distributor comprises essentially a body 207. At one of its ends is provided a chamber 209 in which the control pressure Pc supplied by the supply channel 202 is effective, and an abutment 210. At the other end is provided a chamber 208 connected to the sump, in which is placed an elastic means, for example, a spring 211 applying on the one hand against a regulatable abutment 212 through the intermediary of a cup 213 and on the other hand on a piston 214 through the intermediary of a cup 215. The body of the distributor and the piston are formed in such a way that when the piston is in abutment against the part 209, the channel 218 which is connected to the sump is placed in communication with the channel 216 which connects the distributor to one of the ends of the double effect jack associated therewith. The channel 220 which is at the general pressure P of the injection press is placed in communication with the channel 217 which connects the distributor to the end of the jack. The channel 219 which, depending on the position of the piston 214, connects the distributor to the sump, is switched off. If the piston is moved against the elastic means 211 and moves away from the abutment 210, the assembly is arranged such that at a given instant all the channels are switched off. As it moves further away from the abutment 210, the channel 218 remains isolated while the channel 216 is placed in communication with the channel 220 and the channel 217 with the channel 219. An abutment 221 in the body 207 prevents the piston 214 from being displaced beyond this position.

It is to be assumed that the machine comprises a time basis, for example, an electric motor-reducer, the wheel of which makes a rotation for each cycle of the machine. A cam known as a heart-shaped cam can then be mounted on this wheel. This cam acts on a potentiometer and causes this potentiometer to supply the voltage which increases in a linear manner for half the cycle and then decreases linearly for the other half. This voltage is then converted by means of a servolimiter according to French Pat. No. 1 523 934 into a control pressure Pc from the general pressure P. FIG. 11 shows how the pressure Pc develops during a complete cycle of the injection press:

At the time $t_o$ corresponding to the end of the preceding cycle, the control pressure Pc is equal to $P_o$. At the time $t_1$, the pressure has increased to the value $P_1$ exerting a force $P_1 \times S$ which corresponds to the calibration of the spring of the distributor of the closing jack 108 of the press and causes the same to close, S being the surface of the end of the piston of the distributor on which the control pressure Pc acts.

At the time $t_2$ the control pressure Pc has continued to increase and reaches the value $P_2$ exerting a force $P_2 \times S$ which corresponds to the calibration of the spring of the distributor associated with the core placing jack 111. At the time $t_3$, the control pressure Pc has continued to increase and it reaches the value $P_3$ exerting a force $P_3 \times S$ which corresponds to the calibration of the spring of the distributor associated with the injection jack 104. At the time $t_4$, the control pressure Pc after having passed through a maximum value corresponding to the top of the heart-shaped cam has decreased and returned to the value $P_3$ which causes the piston of the distributor associated with the injection jack 104 to operate in reverse this causing the return of the injection piston. At the time $t_5$, as the pressure continues to decrease, the value $P_2$ is once again obtained and through the intermediary of the distributor associated with the jack 111 causes the latter to operate in the reverse direction to that of the time $t_2$, that is, it causes the cores to be withdrawn. At the time $t_6$, the pressure Pc continues to decrease and returns to the value $P_1$ and causes the press to open through the intermediary of the distributor associated with the jack 108. At the time $t_7$, the decreasing pressure reaches the value $P_4$ exerting a force $P_4 \times S$ which corresponds to the calibration of the spring of the distributor associated with the jack 110 and, through the intermediary of the same causes the ejectors to be brought out. The part is then ejected. At the time $t_8$, the pressure Pc, after having passed through a minimum corresponding to the point of return of the heart-shaped cam, rises again and reaches the value $P_4$ causing the jack 110 to operate in the opposite direction, that is, causing the ejectors to return to their rest position. At the time $t_9$, the pressure Pc continues to rise and again attains the value $P_o$ and a new cycle begins when the time base motor starts again.

In actual fact, the elastic means of the distributors associated with each jack are regulated in such a way that the force exerted on the piston 214 of each jack by the pressure Pc acting on the surface S of the piston is equilibrated up to the critical values $P_1$ for the distributor of the jack 108, $P_2$ for that of the jack 111, $P_3$ for that of the jack 104 and $P_4$ for that of the jack 110. When Pc passes these various critical values, the piston of the corresponding distributor is displaced and, as Pc is solely a function of the time, the piston comes into abutment against the parts 221. The channels are then connected and the associated jack is activated. Likewise, when the pressure Pc decreases, there occurs an instant where the force Pc $\times$ S is lower than the force exerted by the elastic means and the piston of the distributor moves back into abutment against the part 210, thus switching into the reverse direction thereby causing the double effect jack associated with the distributor to be displaced in the opposite direction.

It will be readily comprehended that a device of this nature enables the course of the operating cycle to be modified at random by varying the profile of the cam. In particular, the operational part of the cycle can be effected at a normal rhythm and the parts of the cycle corresponding to the return of the elements can be carried out at an accelerated rhythm. Likewise, it would also be easy to vary the precise instant in the cycle at which each of the jacks has to be activated by adjusting the abutments 212, thus modifying the calibration of the elastic means 211.

While the invention has been described in detail and with reference to specific embodiments thereof, it will be apparent that various changes can be made therein without departing from the spirit and scope thereof.

What is claimed is:

1. The hydraulic sequential control device for a multi-speed ratio vehicle gear box of an automotive type vehicle, said gear box including a hydraulically displaceable control element for controlling said gear box to provide a given transmission speed ratio, said device comprising:

means for supplying a variable current as a base signal function of the speed of the vehicle, means for processing and amplifying said variable current, at least one servolimiter comprising a solenoid operated variable position valve, said valve including a solenoid and a magnetically displaceable valve needle controlled thereby, means for supplying said amplified, variable current to said servolimiter such that said servolimiter supplies a variable hydraulic control pressure, means responsive to at least one supplementary operating parameter of said vehicle other than said base signal, directly mechanically acting on said valve needle to vary the control pressure in addition to said base signal acting thereon to vary the control pressure supplied by the servolimiter at least by a ratio of one to two between the minimum value and the maximum value of said supplementary parameter, hydraulic distributor means controlled by said control pressure, resulting both from the actuation of said base signal and the operation of said supplementary parameter for delivering a general service pressure to said gear box to actuate said control element, and wherein said means responsive to said at least one supplementary operating parameter acting on said valve needle comprises elastic means operatively acting on said valve needle in opposition to the electromagnetic force exerted on the valve needle by said solenoid, and means for varying the output force of said elastic means as a function of the value of said supplementary parameter.

2. The hydraulic sequential control device for a multi-speed ratio vehicle gear box according to claim 1, wherein said elastic means comprises a spring subject to both compression and tension, and means are provided for connecting one end of said spring to said valve needle of said servolimiter, and for connecting the other end of said spring to a displaceable vehicle element responsive to said supplementary parameter of vehicle operation.

3. The hydraulic sequential control device for a multi-speed ratio vehicle gear box according to claim 1, wherein said means responsive to at least one supplementary operating parameter acting on said valve needle comprises a cam, said elastic means comprises a compressible and expansible spring, said spring having one end operatively connected to said servolimiter valve needle and the other end in operative contact with said cam, and wherein said device further comprises means for rotating said cam in response to a displaceable element of the vehicle which moves in response to a variation of said supplementary parameter.

4. A hydraulic sequential control device for a vehicle including a multi-speed ratio vehicle gear box, said gear box including multiple control jacks for providing a plurality of given transmission speed ratios, said device comprising:

means for supplying a variable current as a base signal function of the speed of the vehicle, means for processing and amplifying said variable current, a servolimiter responsive to said current for supplying a variable hydraulic control pressure, a hydraulic distributor operatively supplying a general service pressure to one of said jacks, said distributor comprising a slide valve controlled by said variable hydraulic control pressure, and biasing means normally biasing said slide valve to a first position for venting said one jack, said slide valve being actuated against said biasing means by a predetermined value of said hydraulic control pressure for movement to a second position for supplying said general service pressure to said one jack to actuate the same with said biasing means being such that the control pressure necessary to move said slide valve from said first position and overcome said biasing means is different from that control pressure acting on the slide valve when said biasing means overcomes said control pressure to shift said slide valve from said second position to said first position, whereby said gear box is activated in response to a given value of said control pressure when said slide valve is moving in one direction and is activated under a different value of said control pressure when said slide valve is moving in the other direction.

5. A hydraulic sequential control device for a vehicle including a four speed ratio forward direction only gear box, said device comprising:

means for supplying a variable current as a base signal function of the speed of the vehicle, means for processing and amplifying said variable current, a servolimiter responsive to said current for supplying a variable hydraulic control pressure, means controlled by said variable hydraulic control pressure for actuating said gear box to shift the gears therefrom from one speed ratio to another, a hydraulic circuit supplying a general service pressure to said servolimiter and to the means for actuating said gear box, said means for actuating said gear box comprising two hydraulic distributors mounted in parallel and two double effect jacks for each distributor, each distributor further comprising a slide valve, and means for normally biasing said slide valve to a first position corresponding to a predetermined speed ratio of the gear box with said slide valve being moved to a second position shifting the gear box to a different speed ratio when the force exerted on the slide valve by the hydraulic variable control pressure reaches a value greater than the spring rate of the corresponding biasing means, feed circuits connecting said jacks to corresponding distributors, and said device further comprising a supplementary hydraulic circuit for connecting the chamber of one distributor on the same side of its biasing means to the feed circuit of one of said two jacks associated with said other distributor such that at different control pressures different ones of the slide valves of said distributors are actuated to effect shifting of said gear box from ratio to ratio in a given order by application of the general service pressure with corresponding decreasing values of said variable control pressure acting to shift the slide valves of the various distributors in the opposite manner to effect reverse speed ratio shifts of said gear box.

* * * * *